United States Patent [19]

Burch, Jr. et al.

[11] Patent Number: 5,084,497

[45] Date of Patent: * Jan. 28, 1992

[54] PREPARATION OF ARTICLES OF MANUFACTURE FROM ISOTROPIC AND ANISOTROPIC POLYAMIDE ANION SOLUTIONS

[75] Inventors: Robert R. Burch, Jr., Exton, Pa.; Hans-Werner Schmidt, Goleta, Calif.

[73] Assignee: E. I. Du Pont de Nemours and Company, Wilmington, Del.

[*] Notice: The portion of the term of this patent subsequent to Apr. 25, 2006 has been disclaimed.

[21] Appl. No.: 530,363

[22] Filed: May 30, 1990

Related U.S. Application Data

[63] Continuation-in-part of Ser. No. 99,751, Sep. 22, 1987, abandoned.

[51] Int. Cl.$^5$ ............................ C08K 5/45; C08K 5/41
[52] U.S. Cl. ...................................... 524/173; 524/606
[58] Field of Search ............................... 524/173, 606

[56] References Cited

U.S. PATENT DOCUMENTS 4,785,038  11/1988  Sweeny ............................... 524/173
4,824,881  4/1989  Kim ..................................... 524/606

OTHER PUBLICATIONS

Flood et al., J. Appl. Polym. Sci., 27, 2965 (1982).
Aoki et al., Polymer Engineering and Science, 20, 221 (1980).
Takayanagi et al., Journal of Polymer Science, Polymer Chemistry Edition, 19, 1133 to 1145 (1981).
Takayanagi et al., Journal of Polymer Science, Polymer Chemistry Edition, vol. 21, 31 to 39 (1983).
Bodaghi et al., Polymer Engineering and Science, 24, 242 to 251 (1984).

*Primary Examiner*—Paul R. Michl
*Assistant Examiner*—Yong S. Lee

[57] ABSTRACT

A process for preparing shaped articles of manufacture such as fibers, films and coatings from aromatic polyamide anions in liquid sulfoxides; anisotropic solutions of aromatic polyamide anions useful for the preparation of shaped articles having anistropic properties; isotropic solutions comprising the potassium salt of the polyamide anion; and methods for regulating solution viscosity by control of the degree to which the aromatic polyamide anions are deprotonated.

31 Claims, No Drawings

PREPARATION OF ARTICLES OF MANUFACTURE FROM ISOTROPIC AND ANISOTROPIC POLYAMIDE ANION SOLUTIONS

CROSS-REFERENCE TO RELATED APPLICATION

This is a continuation-in-part of copending patent application Ser. No. 07/099,751, filed on application Serial No. 07/099,751, filed on Sept. 22, 1987, now abandoned.

BACKGROUND OF THE INVENTION

1. Field of the Invention

This invention concerns isotropic and anisotropic solutions of aromatic polyamide anions, the preparation of articles of manufacture from isotropic and anisotropic aromatic polyamide anion solutions and articles of manufacture made therefrom.

2. State of the Art

It is known that sodium hydride reacts with dimethylsulfoxide under anhydrous conditions with evolution of hydrogen to provide the so-called "dimsyl" anion. The dimsyl anion can be used to remove protons from a variety of compounds such as amines, amides, acetylenes and weakly acid hydrocarbons. Typical reactions have been described by Corey et al., J. Am. Chem. Soc., 87, 1345 to 1353, 1965, among others. Takayanagi et al. have extended the reaction of the dimsyl anion with amides to relatively low molecular weight aromatic polyamides and have used the aromatic polyamide anion thus formed to produce a variety of N-substituted products. See, for instance, J. Poly. Sci. (Polymer Chemistry Edition) 19, 1133 to 1145 (1981), which is hereby included by reference. However, this earlier work shows no recognition of solution anisotropy and there is nothing to suggest the preparation of useful articles such as films, fibers, coatings and coated substrates from dimethylsulfoxide or other liquid sulfoxide solutions of aromatic polyamides. Such solutions, both isotropic and anisotropic, over a wide range of concentrations, have now been found to be an excellent resource from which to prepare useful articles.

Other background publications include:

Takayanagi et al., Journal of Polymer Science, Polymer Chemistry Edition, Vol. 21, 31 to 39 (1983);

Ogata et al., Journal of Polymer Science, Polymer Chemistry Edition, Vol. 22, 865 to 867 (1984);

Takayanagi et al., Journal of Applied Polymer Science, Vol. 29, 141 to 151 (1984);

Takayanagi et al., J. Macromol. Sci.-Phys., B17(4), 591 to 615 (1980);

Takayanagi et al., Journal of Applied Polymer Science, Vol. 29, 2057 to 2067 (1984) and 2547 to 2559, and Vol. 27, 3903 to 3917 (1982);

Bodaghi et al., Polymer Engineering and Science, 24, 242 to 251 (1984);

Takayanagi, Pure and Appl. Chem., 55, 819 to 832 (1983);

Moore and Mathias, in J. of Applied Polymer Science, 32, 6299 to 6315 (1986);

Takayanagi and Katayose, in J. Polym. Sci., Polym. Chem. Ed., 19, 1133 to 1145 (1981);

Japanese Patent Publications 58/7426, 59/223752 and 57/195136; U.S. Pat. No. 4,228,218; Yamada et al., J. Appl. Polym. Sci., 32, 5231 (1986); Flood et al., J. Appl. Polym. Sci., 27, 2965 (1982); and Aoki et al., Polymer Engineering and Science, 20, 221 (1980).

Aromatic polyamides are known to be soluble in sulfuric acid and hydrogen fluoride. However, the corrosivity of such solvents together with other factors attendant upon their use have combined to limit somewhat the development of commercial uses for the aromatic polyamides. With solvent systems such as amide-salt combinations, e.g., dimethylacetamide/lithium chloride, high salt levels are necessary to achieve concentrated polymer solutions. This, in turn, may affect utilization of these solutions for certain applications.

SUMMARY OF THE INVENTION

This invention relates to a process for preparing shaped articles of manufacture such as fibers, films and coatings from aromatic polyamide polymers in liquid sulfoxides. This invention also relates to anisotropic solutions of aromatic polyamide anions useful for the preparation of shaped articles having anisotropic properties, and to isotropic solutions comprising the potassium salt of the polyamide anion. Isotropic solutions containing a potassium cation have been found to exhibit unexpectedly lower solution viscosities for any given molecular weight than the corresponding sodium salt.

The aromatic polyamide anions are formed by dissolving the polymers in a sulfoxide which has been contacted with a base such as a metal hydride. A sulfoxide molecule in anionic form acts to remove a proton from the polymer, which forms stable solutions of the resulting aromatic polyamide anions. The anionic form of the sulfoxide is formed by reaction of the sulfoxide with a base, preferably, by reaction with sodium or potassium hydride Cations other than sodium and potassium may be present as well.

An additional aspect of this invention springs from the discovery that solution viscosity is a function of the degree to which the aromatic polyamide is deprotonated. Viscosity is highest when the polymer is fully deprotonated and becomes lower as reprotonation occurs, recognizing that the aromatic polyamide anions will become insoluble at high levels of reprotonation. It is obvious to one skilled in the art that soluble aromatic polyamide anion is truly a polyanion that is a aromatic polyamide molecule from which many protons have been removed from amido nitrogen atoms. The term aromatic polyamide anion herein encompasses "polyanions". Correlation will vary between the particular polyamide anion in solution and the precise effect on viscosity of a certain level of protonation. Nevertheless, as will be seen representatively in the Table following the Examples, viscosity does decrease as the level of reprotonation increases.

In the same way, an increase in the level of reprotonation of the aromatic polyamide anion solution will cause a decrease in solution viscosity. It is well known that solution viscosity affects ease of fiber formation and influences fiber properties. Film formation also is dependent on solution viscosity. Importance of the control that can now be maintained through this technique of deprotonation/reprotonation (control of degree of protonation) will be very evident to anyone skilled in this art.

Actual methods to control the level of protonation and, hence, viscosity may vary. This invention contemplates a number of methods to effect this control including: (i) controlling the viscosity of the solution by mixing fully deprotonated aromatic polyamide anion with sufficient protonated polymer to achieve the desired viscosity, (ii) lowering the viscosity of a solution comprising partially or fully deprotonated aromatic polyamide anion by adding thereto an acid having a lower pKa than that of the polymer, and (iii) raising the viscosity of a solution containing partially or fully protonated aromatic polyamide anion by adding thereto controllable amounts of a base whose conjugate acid has a higher pKa than that of the polymer.

Contemplated acids that can be employed to lower viscosity according to step (ii) include: acetic, sulfuric, nitric, phosphoric, hydrochloric, hydrobromic, and the like. Contemplated bases for use according to step (iii) include alkali metal hydrides and similar strongly basic materials.

Contemplated aromatic polyamide anions contain the following units:

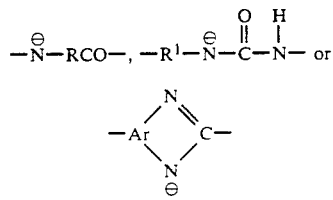

wherein:
R is selected from $R^3$ and $R^1NHCOR^2$;
$R^1$ and $R^3$, individually, are selected from m-phenylene, p-phenylene, 3,3'-biphenylene, 3,4'-biphenylene, 4,4'-biphenylene and 4,4'-diphenylene ether;
$R^2$ is selected from $R^1$ and $-(CH_2)_x$;
Ar is an aryltriyl radical in which two of the three radical bonds are adjacent to one another and attached to nitrogen atoms; and
x is 1 to 10, preferably 1 to 4.

The unit as described can be substituted with one or more additional substituents that do not interfere with solution formation as described herein. Preferred among these optional substituents are halogen, most preferably chlorine and bromine, and $C_xH_{2x+1}$ wherein x is 1 to 10. Representative of contemplated aryltriyl radicals (Ar) is 1,2,4-benzenetriyl.

When the aromatic polyamide is derived from a polyamide comprising repeating units of $R^3$ solely, it can be characterized as a homopolymer. Homopolymers are also formed when $R^1$ and $R^2$ are the same throughout the polyamide. Copolyamides result when $R^1$ and/or $R^2$ vary within the polymer matrix. It is also contemplated that relatively minor amounts of aliphatic components can be present with the aromatic moieties so long as they do not adversely affect solution stability of film-formability. It is obvious to one skilled in the art that the amido protons will be removed from the polymer in the order of most acidic to least acidic. In a partially deprotonated aromatic polyamide anion, the most acidic protons will be removed to form the anion.

This invention also relates to articles of manufacture made from the polymer solutions of this invention and to a method for making such articles by removing the aromatic polyamide anion from solution, e.g., by precipitation, by addition of acid, by addition of a nonsolvent, or by concentrating the solution to solidify the polymer, then converting the polymer to a formable mass and shaping it to the desired geometry. The articles are characterized by physical and chemical profiles reflective of the novel aromatic polyamide anion solutions from which they are made. In addition, it has been found that aromatic polyamide anions in which $R^1$ and $R^3$ are p-phenylene form anisotropic solutions and articles made from such solutions display anisotropic properties.

DETAILS OF THE INVENTION

The Polymers

Contemplated polymers from which the aromatic polyamide anions are prepared include aromatic polyamides containing the —NH— function as part of the polymer unit. Useful aromatic polyamides are described in U.S. Pat. No. 3,869,429 and U.S. Pat. No. 4,075,172. Polymers used should have at least a film-forming molecular weight, preferably a weight average molecular weight of about 2500 or more. Preferred molecular weights are about 3300 or more, indicated by an inherent viscosity of about 0.4 or greater measured at 0.5% concentration in concentrated (95% to 98%) sulfuric acid at 30° C. Contemplated polymers include poly(paraphenylene terephthalamide), herein PPTA, poly(metaphenylene isophthalamide), poly(parabenzamide), poly(4,4'-biphenylene isophthalamide), poly(chloroparaphenylene isophthalamide) and copolymers thereof. The polymers contemplated for use in this invention are soluble only with great difficulty in typical solvent systems known heretofore.

In particular, the polyamides used to prepare the aromatic polyamide anion have the following repeat unit:

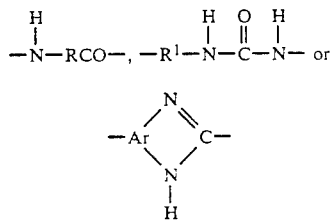

wherein:
R is selected from $R^3$ and $R^1NHCOR^2$;
$R^1$ and $R^3$, individually, are selected from m-phenylene, p-phenylene, 3,3'-biphenylene, 3,4'-biphenylene, 4,4'-biphenylene and 4,4'-diphenylene ether;
$R^2$ is selected from $R^1$ and $-(CH_2)_x$;
Ar is an aryltriyl radical in which two of the three radical bonds are adjacent to one another and attached to nitrogen atoms; and
x is 1 to 10, preferably 1 to 4.

The unit as described can be substituted with one or more additional substituents that do not interfere with solution formation as described herein. Preferred among these optional substituents are halogen, most preferably chlorine and bromine, and $C_xH_{2x+1}$ wherein x is 1 to 10. Representative of contemplated aryltriyl radicals (Ar) is 1,2,4-benzenetriyl.

When the aromatic polyamide is derived from a polyamide comprising repeating units of $R^3$ solely, it can be characterized as a homopolymer. Homopolymers are also formed when $R^1$ and $R^2$ are the same throughout the polyamide. Copolyamides result when $R^1$ and/or $R^2$ vary within the polymer matrix. It is also contemplated that relatively minor amounts of aliphatic components can be present with the aromatic moieties so long as they do not adversely affect solution stability of film-formability.

The Solvent System and Solutions

Liquid sulfoxides that are useful as solvents in the practice of this invention include the following:

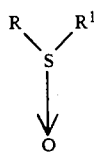

where R and $R^1$, which can be the same or different, are alkyl of three or fewer carbon atoms, and can be combined with the sulfoxide group to form a cycloaliphatic ring. Preferred are dimethylsulfoxide (DMSO) and tetrahydrothiophene oxide (THTO). Water and alcohols should be substantially absent, that is less than 0.1 mole of water and alcohol per equivalent of aromatic polyamide anion. Notwithstanding the limitations on the presence of water and alcohols, minor amounts of other organic co-solvents, such as N,N-dimethylformamide, in proportions which do not precipitate the aromatic polyamide anion, can also be employed.

The aromatic polyamides are converted to homogeneous solutions of the aromatic polyamide anion in the sulfoxide by reacting them with the sulfoxide carbanion. The carbanion can be formed by combining a strong base, preferably a metal hydride, with the sulfoxide at a temperature of about 25° C. to 80° C. Suspensions of metal hydrides in mineral oil can be used but, for best results, the mineral oil should be removed prior to reaction with the sulfoxide.

The aromatic polyamide anion solutions are generally prepared with solids content of about 1.5 to 1.7 weight percent. Solutions with a higher aromatic polyamide anion content, up to 12 weight percent and more, can be obtained for example by evaporating the solvent in vacuum or freeze drying. Solutions with a higher aromatic polyamide anion content can also be obtained by preparing a solution in which the aromatic polyamide anion is only partially deprotonated. The solutions can be purified by filtering and the concentration can be determined by reprecipitation.

To prepare solutions of aromatic polyamide anion, it is necessary only to contact the polyamide with the components which form the solvent system. The order of addition is not critical although the solvent system is usually made up before immersion of the polyamide to be dissolved. It would be acceptable, however, to disperse the polyamide to be dissolved in the sulfoxide solvent component and then add to that dispersion the metal hydride component.

The solutions are preferably prepared at temperatures less than 50° C. since prolonged exposure at higher temperatures may result in reduction in molecular weight. The degree of degradation, of course, depends on polymer structure. Little degradation of poly(-paraphenylene terephthalamide) anion solutions occurs on prolonged storage at ambient temperatures.

The amount of polyamide which can be dissolved by the instant solvent system is a function of ability to handle the generated solution viscosity. In this regard, extended chain polymers, such as PPTA provide higher solution viscosities at equivalent concentrations and molecular weights vs. flexible chain polymers, such as poly(metaphenylene isophthalamide). Concentrations of polymer attainable in the solutions will vary with the polymer structure, with the degree of deprotonation and with molecular weight as determined by inherent viscosity.

It has been found that anisotropic solutions can be formed from the more extended chain polymer anions, such as PPTA anion at varying concentrations of aromatic polyamide anion in solution, depending in large measure on the identity of the counter cation. In this regard, see Table 1 hereafter.

Certain terms, as used herein, and Applicant believes commonly used by those skilled in the art, are defined hereinafter. The term "anisotropic" as applied to polymer and solution of polymers (including polymer anions) refers to the fact that the polymer (solution) has different properties in different directions. These properties include, but are not limited to, refractive index, viscosity, modulus, strength, and thermal coefficient of expansion. Isotropic polymers are in a sense the opposite of anisotropic polymers, that is they have the same properties in all directions. For polymers in the liquid state or in solution, the simplest test for anisotropy is to test whether the polymer (solutions) are birefringent, which is done using crossed polarizers, usually under a microscope. Liquid polymers and polymer solutions that are birefringent are considered to be an aniosotropic. There is one "exception" to this. When a polymer or polymer solution is birefringent in a shear field, but he birefringence quickly disappears when the shear filed is removed, that polymer is not normally considered anisotropic, as that term is used herein and Applicant believes, commonly used by those skilled in the art. In fact, it is anisotropic only in the shear field, and that anisotropy is quickly lost when the shear field is removed. A quick test for shear birefringence is to have molten polymer or polymer solution between two slide plates on a microscope stage and move the plates with respect to one another; this creates a shear field. When the motion of the plates stops, if the birefringence quickly (within a minute or two) disappears, the polymer (solution) is shear birefringent only.

Articles of Manufacture

One skilled in the art will be able to fabricate a wide range of useful articles from the solutions of this invention, including films, fibers, coatings, coated and encapsulated materials and the like With respect to films, their preparation from the instant solutions will insure excellent physical and chemical properties. Such properties include low salt content, good temperature stability and uniformity.

Films have been prepared from isotropic and anisotropic polyamide anion solutions. Films, from isotropic solutions having balanced properties in all directions, can be prepared by standard solution casting techniques at about 25° C. to 70° C. Selected coating temperatures are dependent, among other things, on the viscosity of the solution. Depending on the treatment of the cast solutions, films of either polyamide or polyamide anion can be prepared as follows:

(i) quenching in protic solvent produces polyamide film;

(ii) quenching in non-protic solvent produces polyamide anion film;

(iii) evaporation of the sulfoxide produces polyamide anion film; and (iv) polyamide anion film contacted with a protic solvent will produce a polyamide film.

Very good polyamide films have been prepared according to method (i) by quenching the cast solutions into a coagulation bath of water with traces of sulfuric acid. The remaining solvent and salt was completely removed from the film by several washings with water. The films were put on frames and dried at room temperature. During this drying operation, the films shrunk and developed strong tension. The final drying was accomplished at about 130° C. overnight or in vacuum at temperatures up to about 180° C. The resulting films were thin, clear, uniform and visually without defects.

Coagulation of cast solutions of aromatic polyamide anion/sulfoxide into dry acetone, according to method (ii), resulted in the formation of polyamide anion films that were then dried at 130° C. in the absence of moisture. Evaporation of sulfoxide at 100° C. for about 20 to 30 minutes and drying at 130° C. resulted in polyamide anion films according to method (iii). The major difficulty associated with this latter procedure is that any remaining solvent has a detrimental effect on e properties of the produced films. The aromatic polyamide anion films are converted with water, according to method (iv), to polyamide films within seconds, the water acting as an acid.

Aromatic polyamide anion/sulfoxide solutions can also be used as dopes for fiber spinning. Fibers were prepared by a dry spinning process and by a dry jet-wet spinning process. Anisotropic solutions of aromatic polyamide anion are preferably used as dopes for fibers. The temperature of the spin dope was 70° C. to 75° C. and the size of the nozzle was 5 mil. Water and methanol were used as coagulants. The fibers were washed with water for 24 hours and dried for several hours at room temperature. Final drying was done in an air oven at 120° C. The denier of the fibers was approximately 7.

Coagulation into acetone resulted in the preparation of a polyamide anion fiber. The fiber was dried at 120° C. The denier was approximately 7. Washing with water will convert the polyamide anion fiber to polyamide fiber within seconds.

Dry spinning of the aromatic polyamide anion was done with a solution having a solids content of approximately 10 weight percent. The column temperature for the evaporation of the solvent was 240° C. A colored polyamide anion fiber was collected. The as-spun fibers contained dimethylsulfoxide which was almost completely removed by drying the fibers at higher temperatures. A part of the as-spun fibers was placed into water and converted to polyamide fibers within seconds. The polyamide fibers were dried at 120° C.

Aromatic polyamide anion/sulfoxide solutions can also be used for the preparation of polymer coatings. The advantage in using these solutions for coatings is the noncorrosive solvent. This makes possible the coating and encapsulating of a variety of substrates normally attacked by sulfuric acid or HF.

Articles made from the isotropic and anisotropic solutions of this invention have several distinguishing characteristics, including the following: good homogeneity, and good color and thermal and mechanical properties.

It has been found that films cast form sulfoxide solutions of poly(para-phenylene terephthalamide) anions according to Examples 2 and 5, have novel uniplanar orientation in which the chain axis lies in the plane of the film, and the crystallographic b axis, the hydrogen bonding direction, lies normal to the plane, and further provided that the crystallite size along the chain axis is about 35Å and the crystalline size in the hydrogen bonding direction is about 12Å. Compare this for example to the different crystalline modification first described by M. G. Northolt in Eur. Polym. J., Vol. 10, p. 799 (1974) [labeled "Form I" by K. Haraguchi, T. Kajiyama and M. Takayanagi, J. Appl. Polym. Sci., Vol. 23, p. 903 (1979) (see especially FIG. 1) and by K. Haraguchi, T. Kajiyama and M. Takayanagi, J. Appl. Polym. Sci., Vol. 23, p. 915 (1979)]. Solvent molecules hydrogen-bonded to the amide groups may have affected crystallite growth in the hydrogen-bonding direction.

The following Examples illustrate the invention. The weight average molecular weight of the polymer used in the Examples was about 53,300.

EXAMPLE 1

Preparation of PPTA Anion Sodium Salt

Sodium hydride (1/25 g, 97% purity) ($5.04 \times 10^{-2}$ mol) was weighed in a dry box and transferred to a one-liter three-neck flask equipped with a mechanical stirrer, condenser and nitrogen inlet tube. Dimethylsulfoxide, 400 ml, was added by syringe and the reaction was heated at 80° C. for one hour in an oil bath until hydrogen bubbles were no longer visible. PPTA pulp, 6 g ($5.04 \times 10^{-2}$ mol amide groups) was added through a powder funnel after the reaction had cooled somewhat. Stirring the solution overnight at room temperature resulted in the dissolution of all PPTA.

EXAMPLES 2 AND 3

The solution of Example 1 was cast on a glass slide and quenched in a coagulation bath of water/sulfuric acid. The film was dried at 130° C. under tension. The film properties (thickness: 0.00025 inch, density: 1.365 g/cc) were:

|  | Machine Direction | Transverse Direction |
|---|---|---|
| Tensile Modulus: | 720 to 800 kpsi | 720 to 820 kpsi |
| Tensile Strength: | 19 to 24 kpsi | 21 to 24 kpsi |
| Elongation at Break: | 5.2 to 6.7% | 4.4 to 6.6% |
| Elmendorf Tear: | 7.0 g/mil | 6.7 g/mil |

EXAMPLE 4

Preparation of PPTA Anion Potassium Salt

Potassium hydride (35% suspension in mineral oil), 5.77 g, was weighted directly into a one-liter three-necked flask where it was washed four times with about 25 ml of dry hexane to remove the mineral oil. After each addition of hexane, the flask was swirled and the potassium hydride allowed to settle before the hexane mineral oil layer was suctioned off with a filter stick. The flask was maintained under nitrogen flow throughout this procedure. The potassium hydride powder was dried by passing a nitrogen stream through the flask. Dry dimethylsulfoxide, 400 mol, was added by syringe at room temperature, washing potassium hydride off the frit. Reaction of potassium hydride with dimethylsulfoxide was immediate. The filter stick was replaced with a mechanical stirrer. The reaction mixture was stirred for thirty minutes until no more hydrogen bubbling was observed. Dry PPTA pulp (6 g) was added through a powder funnel while stirring at room temperature until a clear, red solution was obtained.

EXAMPLE 5

The solution of Example 4 was cast on a glass slide and quenched in a coagulation bath of water with a few drops of sulfuric acid. The properties of the film dried under tension at 130° C. to a thickness of 0.00025 inch, are given below.

|  | Machine Direction |
|---|---|
| Tensile Modulus: | 920 to 1000 kpsi |
| Tensile Strength: | 21 to 23 kpsi |
| Elongation at Break: | 4.7 to 5.0% |

EXAMPLE 6

Preparation of Fibers

Fibers were spun from an anisotropic solution of PPTA sodium salt (solids content 5.4 weight percent). The temperature of the spin dope was 70° C. to 75° C. and the size of the nozzle was 5 mil. The fibers were coagulated in water, washed with water for 24 hours and dried for several hours at room temperature. Final drying was done in an air oven at 120° C. The denier of the fibers was about 7. The fiber had a modulus of 160 g/den, tenacity of 4.6 g/den and an elongation of 4.8%.

EXAMPLE 7

Example 6 was repeated using acetone as the coagulation bath. The fiber was dried at 120° C. The denier was about 7. The fibers had a deeper yellow color than those of Example 6. Washing with water converted the PPTA anion fibers into PPTA fibers within seconds. The PPTA sodium salt fiber had a modulus of 120 g/den, tenacity of 2.7 g/den and an elongation of 4.2%.

EXAMPLE 8

Fibers were dry-spun from an anisotropic solution of PPTA sodium salt (solids content 10 weight percent). The column temperature for the evaporation of the solvent was 240° C. The resultant fiber was further dried at 120° C. but still contained some dimethylsulfoxide. The fiber had a modulus of 48 g/den, a tenacity of 1.2 g/den and an elongation of 4.4%.

EXAMPLE 9

The fibers of Example 8 were immersed in water. The conversion was complete in seconds and the color of the fibers changed from orange to almost white. The fibers, dried at 120° C., had a modulus of 165 g/den, a tenacity of 4.2 g/den and an elongation of 4.9%.

EXAMPLE 10

A piece of copper wire was dipped into a solution of PPTA sodium salt, then quenched in water and dried. Examination of the copper wire showed it to be coated with a think film of PPTA.

EXAMPLES 11 TO 20

The formation of anisotropic phases in PPTA anion solutions was demonstrated by polarizing microscopy. Solutions with different polymer concentrations were observed to determine the critical concentration regions for the transition from the isotropic to the anisotropic phase. Solutions of PPTA sodium salt and PPTA potassium salt were prepared as described in Examples 1 and 4. The solutions were concentrated by evaporating the solvent under vacuum. Each solution was observed by polarizing microscopy. The results are listed in Table 1.

TABLE 1

Microscopic Observations of PPTA Anion Solutions

| Ex. No. | Concentration of PPTA$^-$Na$^+$ (Weight Percent) | Results |
|---|---|---|
| 11 | 1.5 | Isotropic, shear birefringence |
| 12 | 2.1 | Biphasic, birefringent regions |
| 13 | 2.7 | Biphasic, increased birefringence |
| 14 | 4.4 | Almost completely birefringent |
| 15 | 5.3 | Completely birefringent |
| 16 | 6.3 | Completely birefringent |
|  | Concentration of PPTA$^-$K$^+$ (Weight Percent) |  |
| 17 | 1.7 | Isotropic |
| 18 | 6.3 | Isotropic, shear birefringence |
| 19 | 8.6 | Isotropic, shear birefringence |
| 20 | 11 to 12 | Almost completely birefringent |

The results show that the concentration of PPTA anion needed for conversion of isotropic solutions to anisotropic solutions is dependent upon the counter cation. Further, at low concentrations of PPTA anion for both systems, the solutions do not exhibit aniostropy.

EXAMPLE 21

A PPTA anion solution in which 75% of the amido groups were deprotonated was prepared by the following procedure. A 48.8 g sample of a pre-formed solution of 1.33 weight percent of fully deprotonated PPTA was treated with 0.214 g of PPTA pulp and 14.6 mL of additional DMSO to maintain 1.3 weight percent solids. Within 18 hours, the additional fibers had dissolved to yield a clear, read, homogeneous solution of partially deprotonated PPTA (PPTA anion).

EXAMPLE 22

A PPTA anion solution in which 75% of the amide bonds were deprotonated was prepared using a deficiency of base. A solution of 0.094M dimsyl anion as the potassium salt was prepared by addition of 0.72 g of KH to 66.7 mL of DMSO. To this solution was added 1.00 g of PPTA pulp. Within 48 hours at room temperature, with stirring, the fibers were fully dissolved to yield a clear, red, homogeneous solution of partially deprotonated PPTA (PPTA anion).

EXAMPLE 23

A PPTA anion solution was prepared in which 75% of the amide bonds were deprotonated by treatment of fully deprotonated polyanion with strong acid. A 48.8 g sample of a pre-formed solution of 1.33 weight percent of fully deprotonated PPTA anion in DMSO was treated with 0.080 mL of acetic acid (sufficient to protonate 25% of the amide bonds). This addition caused a large lump of solid to precipitate. Stirring the resulting mixture for 48 hours at room temperature caused the lump to dissolve completely, leaving a clear, red, homogeneous solution of partially deprotonated PPTA.

EXAMPLE 24

Viscosity measurements were carried out by measuring bubble rise time in calibrated "Cargille" brand viscosity tubes immersed i an oil bath maintained at 25° C. These data are summarized in Table 2 below.

EXAMPLE 25

A solution of K+ dimsyl− was prepared by addition of 2.17 g (18.9 mmol) of KH (35% in mineral oil) to 110 g of DMSO. To this was added 4.00 g of PPTA pulp (33.6 mmol of amide bonds). Within 24 hours at room temperature the PPTA pulp had completely dissolved to yield a clear, red, homogeneous solution (3.50 weight percent) with no fibers detectable by examination under a microscope of aliquots of the solution. The solution was treated with an additional 12.6 mmol of KH in 10 mL DMSO followed by 1.00 g PPTA pulp. Within 12 hours at room temperature, the PPTA pulp had dissolved to yield a free flowing, clear, red, homogeneous solution of 3.97 weight percent. A second treatment with identical amounts of PPTA and KH yielded a 4.96 weight percent solution with no detectable unreacted fibers. A final treatment with identical amounts of KH and PPTA pulp yielded 5.83 weight percent solution. In this case, a small amount of unreacted fiber was detectable even after a period of seven days of reaction. This solution nevertheless had a viscosity low enough to be processed into a film. A solution of fully deprotonated PPTA anion at this concentration is not processible using ordinary laboratory apparatus.

TABLE 2

Dependence of Viscosity on Level of Deprotonation of 1.33 Weight Percent Solutions in DMSO by Bubble Rise Time

| Sample | Viscosity (Stokes) |
|---|---|
| Fully Deprotonated K+ PPTA− | 50.2 ± 0.7 |
| 95% Deprotonated K+ PPTA− | 31.7 ± 1.6 |
| 90% Deprotonated K+ PPTA− | 27.3 ± 1.1 |
| 83% Deprotonated K+ PPTA− | 21.5 ± 0.8 |
| 75% Deprotonated K+ PPTA− | 17.1 ± 0.3 |

The embodiments of the invention in which an exclusive property or privilege is claimed are defined as follows:

1. A solution in a liquid sulfoxide of an aromatic polyamide anion salt containing the unit:

$$-\overset{\ominus}{N}-RCO-, \quad -R^1-\overset{\ominus}{N}-\overset{O}{\overset{\|}{C}}-\overset{H}{\overset{|}{N}}- \text{ or}$$

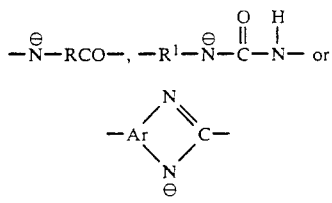

wherein:
R is selected from $R^3$ and $R^1NHCOR^2$;
$R^1$ and $R^3$, individually, are selected from m-phenylene, p-phenylene, 3,3'-biphenylene, 3,4'-biphenylene, 4,4'-biphenylene and 4,4'-diphenylene ether;
$R^2$ is selected from $R^1$ and $-(CH_2)_x-$;
Ar is an aryltriyl radical in which two of the three radical bonds are adjacent to one another and attached to nitrogen atoms; and
x is 1 to 10;
the aromatic polyamide anion having a weight average molecular weight of at least about 2500, the solution being isotropic or anisotropic and when it is isotropic the solution is a potassium salt solution; the solution being further characterized in that solution viscosity is sensitive to the level of aromatic polyamide anion protonation, with the viscosity of any particular aromatic polyamide anion solution generally decreasing as the level of protonation increases, the solution being still further characterized in that it is substantially free of water or alcohol.

2. A solution according to claim 1 wherein the aromatic polyamide anion is a homopolymer.

3. A solution according to claim 2 wherein R is $R^3$.

4. A solution according to claim 3 wherein $R^3$ is m-phenylene.

5. A solution according to claim 3 wherein $R^3$ is p-phenylene.

6. A solution according to claim 3 wherein $R^3$ is 3,3'-biphenylene.

7. A solution according to claim 3 wherein $R^3$ is 3,4'-biphenylene.

8. A solution according to claim 3 wherein $R^3$ is 4,4'-biphenylene.

9. A solution according to claim 2 wherein R is $R^1NHCOR^2$.

10. A solution of a homopolymer according to claim 9.

11. A solution of a homopolymer according to claim 10 wherein $R^1$ and $R^2$, individually, are selected from the group m-phenylene, p-phenylene, 3,3'-biphenylene, 3,4'-biphenylene, 4,4'-biphenylene and 4,4'-diphenylene ether; $R^2$ additionally being selected from $-(CH_2)_x-$.

12. A solution according to claim 11 wherein $R^2$ is selected from $-(CH_2)-_1$ to 4.

13. A homopolymer solution according to claim 11 wherein $R^1 = R^2$.

14. A homopolymer solution according to claim 11 wherein $R^1$ and $R^2$ are different.

15. A homopolymer solution according to claim 13 wherein $R^1$ and $R^2$ are p-phenylene.

16. An anisotropic solution according to claim 1.

17. A solution according to claim 16 wherein the counter ion to the aromatic polyamide anion is Na+.

18. A solution according to claim 16 wherein the counter ion to the aromatic polyamide anion is $K^{30}$.

19. A low salt, heat stable poly(paraphenylene terephthalamide) article of manufacture having a substantially homogeneous composition, wherein said poly(paraphenylene terephthalamide) has a uniplanar orientation in which the chain axis lies in the plane of the film, and the crystallographic b axis, the hydrogen bonding direction, lines normal to the plane, and further provided that the crystallite size along the chain axis is about 35Å and the crystalline size in the hydrogen bonding direction is about 12Å.

20. An article according to claim 19 in the form of a film.

21. An article according to claim 19 in the form of a coating.

22. A method for making an article of manufacture from a solution according to claim 1 comprising:
   (i) removing the aromatic polyamide from solution and
   (ii) shaping the polyamide to form a low salt, heat stable article of substantially homogeneous composition.

23. A method according to claim 22 comprising precipitating the polyamide from solution in step (i).

24. In a solution in a liquid sulfoxide of an aromatic polyamide anion salt containing the unit:

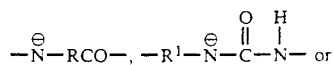

-continued

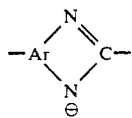

wherein:

R is selected from $R^3$ and $R^1NHCOR^2$;

$R^1$ and $R^3$, individually, are selected from m-phenylene, p-phenylene, 3,3'-biphenylene, 3,4'-biphenylene, 4,4'-biphenylene and 4,4'-diphenylene ether;

$R^2$ is selected from $R^1$ and $-(CH_2)-_x$;

Ar is an aryltriyl radical in which two of the three radical bonds are adjacent to one another and attached to nitrogen atoms; and X is 1 to 10; the aromatic polyamide anion having a weight average molecular weight of at least about 2500, the solution being isotropic or anisotropic and when it is isotropic the solution is a potassium salt solution; the solution being further characterized in that solution viscosity is sensitive to the level of aromatic polyamide anion protonation, with the viscosity of any particular aromatic polyamide anion solution generally decreasing as the level of protonation increases, the solution being still further characterized in that it is substantially free of water or alcohol;

a method for controlling the viscosity of said solution comprising varying the degree to which the polyamide is protonated by one of the following steps:
(i) controlling the viscosity of the solution by mixing the deprotonated polymer with sufficient protonated polymer to achieve the desired viscosity;
(ii) lowering the viscosity of a solution comprising partially or fully deprotonated polymer, by adding thereto an acid having a higher pKa than that of the deprotonated polymer; and
(iii) raising the viscosity of a solution comprising partially or fully protonated polymer by adding thereto to a base whose conjugate acid has a higher pKa than that of the protonated polymer.

25. A method according to claim 24 comprising raising the viscosity of the solution by raising the level of deprotonation by step (i).

26. A method according to claim 24 comprising lowering the viscosity of the solution by lowering the level of deprotonation by step (i).

27. A method according to claim 24 comprising lowering the viscosity by step (ii).

28. A method according to claim 24 comprising raising the viscosity by step (iii).

29. A method according to claim 27 employing an acid selected from the group acetic, sulfuric, nitric, phosphoric, hydrochloric and hydrobromic.

30. A method according to claim 28 employing an alkali metal hydride base.

31. An isotropic potassium salt solution according to claim 1.

* * * * *

UNITED STATES PATENT AND TRADEMARK OFFICE
CERTIFICATE OF CORRECTION

PATENT NO. : 5,084,497
DATED : JANUARY 28, 1992
INVENTOR(S) : ROBERT R. BURCH, JR., ET AL.

It is certified that error appears in the above-identified patent and that said Letters Patent is hereby corrected as shown below:

Column 1, line 29, delete "1965" and insert in its place -- (1965) --.
Column 2, line 35, delete "Cations" and insert in its place -- cations --.
Column 2, line 45, delete "is a aromatic" and insert in its place -- is an aromatic --.
Column 3, line 33, delete "-(-CH$_2$-)$_x$ x" and insert in its place -- $\{$CH$_2\}_x$" --.
Column 6, line 26, delete "aniosio-" and insert in its place -- aniso- --.
Column 6, line 29, delete "but he" and insert in its place -- but the --.
Column 6, line 47, delete "With" and insert in its place -- with --.
Column 7, line 20, delete "effect on e" and insert in its place -- effect on the --.
Column 7, line 62, delete "cast form" and insert in its place -- cast from --.
Column 8, line 1, delete "crystalline" and insert in is place -- crystallite --.
Column 8, line 3, delete "modification" and insert in its place -- modifications --.

UNITED STATES PATENT AND TRADEMARK OFFICE
CERTIFICATE OF CORRECTION

PATENT NO. : 5,084,497

DATED : JANUARY 28, 1992

INVENTOR(S) : ROBERT R. BURCH

It is certified that error appears in the above-indentified patent and that said Letters Patent is hereby corrected as shown below:

Column 8, line 20, delete "1/25 g" and insert in its place -- 1.25 g --.
Column 8, line 51, delete "weighted" and insert in its place -- weighed --.
Column 8, line 60, delete "400 mol" and insert in its place -- 400 mL --.
Column 9, line 57, delete "think film" and insert in its place -- thin film --.
Column 10, line 27, delete "Aniostropy" and replace with -- anisotropy --.
Column 10, line 67, delete "i an oil" and replace with -- in an oil --.
Column 12, line 28 delete "-(-CH$_2$)- $_1$ to 4" and replace with -(-CH$_2$-)-$_x$, x is 1 to 4 --.
Column 12, line 38, delete "K$^{30}$" and replace with -- K$^+$ --.
Column 12, line 46, delete "lines normal" and replace with -- lies normal --.
Column 12, line 48, delete "crystalline" and replace with -- crystallite --.
Column 13, line 20, delete "X is 1 to 10" and replace with -- x is 1 to 10 --.

Signed and Sealed this

Thirty-first Day of May, 1994

Attest:

BRUCE LEHMAN

*Attesting Officer*      Commissioner of Patents and Trademarks